Aug. 5, 1958      E. J. POBAR      2,845,812
HAND BRAKE CABLE ASSEMBLY
Filed Jan. 26, 1953
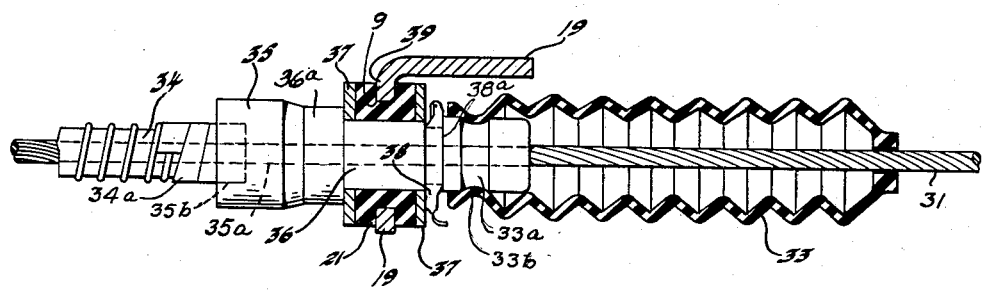
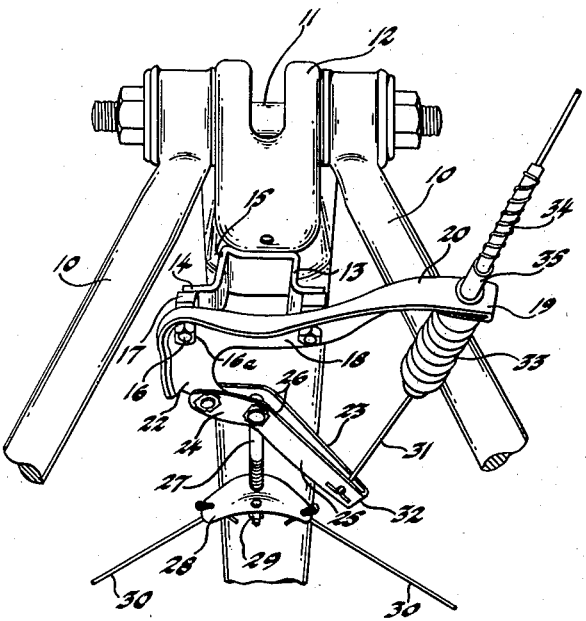
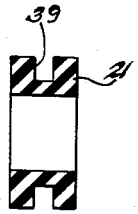
INVENTOR.
EDMUND J. POBAR
BY Carl J. Barbee

United States Patent Office 2,845,812
Patented Aug. 5, 1958

2,845,812

HAND BRAKE CABLE ASSEMBLY

Edmund J. Pobar, Kenosha, Wis., assignor to American Motors Corporation, a corporation of Maryland Application January 26, 1953, Serial No. 333,274

3 Claims. (Cl. 74—501)

This invention relates to a brake construction and more particularly to improvements in hand brake cables and associated mounting structure.

It is an object of this invention to provide a hand brake cable with dampening means interposed between an L-shaped bracket and a hand brake lever to prevent local noises originating from the rear axles to be transmitted to the body of a vehicle.

It is another object to provide in an L-shaped bracket, indirectly secured to the torque tube of a vehicle, an enlarged aperture at one end in which a rubber grommet is secured, this rubber grommet having a central opening through which a hand brake cable piloting sleeve passes, whereby the cable which passes through the sleeve is insulated from the L-shaped bracket by said grommet. Heretofore it has been conventional practice to merely pass the hand brake cable through an opening in its supporting bracket. In operation of the vehicle, a great amount of local noise is transmitted directly to the body from the rear axles as metal contact between the bracket and the brake cable tended to transmit such noise. Under the circumstances therefore, it will be manifest that it is my chief aim to generally improve upon the connection between the bracket and the hand brake cable.

A further object is to provide a novel cable piloting sleeve and means for anchoring same relative to its supporting bracket.

The several objects, advantages and novel details of construction of the invention will be made more apparent as this description proceeds, especially when considered in connection with the accompanying drawings, wherein:

Figure 1 is a view in cross-section of a hand brake cable showing its relationship with the grommet, cable piloting sleeve and supporting bracket.

Figure 2 is a perspective view of the hand brake cable as mounted on the L-shaped bracket and connected with the hand brake equalizer.

Figure 3 is a view showing the grommet used with the hand brake cable.

Referring now more particularly to the drawings wherein like reference characters indicate like parts, is will be noted that there is illustrated fragmentarily, spaced truss rods 10 mounted on a pin 11 with their free ends extending to a rear axle (not shown). A torque tube bracket 12 is interposed between said rods and has the closed end of a U-shaped bracket 13 secured adjacent thereto. The free ends 14 of the spaced legs 15 of bracket 13 are bent outwardly and away at substantially right angles and apertured to receive bolt members 16. A pad or washer 17 is mounted on each bolt and arranged between said ends 14 and a bracket 18 which also is apertured for mounting on the bolts 16. Any suitable fastening elements 16a are threaded on the free ends of the bolts 16 to secure said bracket 18 to U-shaped bracket 13.

The bracket 18 is L-shaped and the free end 19 of one leg 20 is bent over in the form of a U. The free end is apertured at 9 through the U and is of substantial size to receive a rubber grommet 21, the purposes of which will be explained hereinafter.

The other leg of the bracket 18, and designated by the numeral 22, rotatably mounts a lever 23. The lever 23 has one section 24 angularly arranged and integral with another section 25. The lever 23 may be made of a single piece of metal with the sides 26 turned up, as referred to above, to form a substantially U-shaped body member which represents the lever 23 as a whole. The lever 23 is apertured at the juncture of the two sections 24 and 25 to receive a bolt 27, the threaded end of which is arranged to pass through the middle of a hand brake cable equalizer 28 and held thereon through any suitable fastening elements 29 secured to the free end of said bolt.

The equalizer 28 is arcuately shaped and has provision at each end to secure one end of spaced cables 30, the other ends of such cables being each secured to the braking mechanism in one of the rear wheels of a vehicle, not shown. One end 31 of a hand brake cable is secured to the free end 32 of the lever 23 and passes upwardly through a boot 33, grommet 21, cable sheath 34, and is secured in the usual manner to a hand brake lever mechanism, not shown. A cable piloting sleeve identified generally by the numeral 35 has a bore 35a extending therethrough, through which the brake cable 31 passes. The end of sheathing 34a is anchored in a suitable counterbore 35b formed in the end of the sleeve. The grommet 21 is mounted on the diametrically reduced central portion 36 of the sleeve and a pair of washers 37 are journaled on said sleeve portion at opposite ends of the grommet. The diametrically enlarged portion 36a provides an annular shoulder against which one of the washers abuts. A retaining spring 38 is forced into the annular groove 38a formed in the sleeve and serves to retain the washers and grommet in a fixed position relative to the sleeve 35. An annular groove 33a receives the constricted portion 33b of the boot for anchoring the boot onto the end of the sleeve. Thus the cable piloting sleeve is anchored in fixed position relative to the bracket 19 and is insulated therefrom by means of the grommet.

The grommet is provided with an annular groove 39 of substantial depth and width and fits within the aperture 9 formed in the bracket. This grommet thereupon provides a resilient buffer or insulation between the hand brake cable and the L-shaped bracket 18 and the parts of a vehicle to which such bracket 18 is attached.

In operation, therefore, the use of said grommet dampens out body noise which originates in the rear axles and which under ordinary circumstances is transmitted through the equalizer, the L-shaped bracket, torque tube bracket and associated structure to the body of the vehicle.

It is thought that the construction, manipulation, utility, and advantages of this invention will now be apparent to those skilled in this art without a more detailed description thereof.

The present embodiment of the invention has been described in detail merely for the purpose of exemplification since in actual practice it attains the features of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim is:

1. For use with an automotive vehicle having a generally rigid support member, a braking apparatus comprising: a bracket secured to the support member and having an apertured end projecting laterally therefrom;

a cable-actuating lever having pivotal connection with one end of the bracket; an equalizer having pivotal connection with the lever; a cable for actuating the lever and being connected thereto at the end remote from the end which is connected to the bracket; an insulated support for the cable including a rigid sleeve mounted in the aperture of the laterally projecting bracket end; said cable passing through the sleeve and being guided thereby for rectilinear movement relative thereto; a resilient grommet telescopically mounted exteriorly of the sleeve and in the bracket aperture for insulating the bracket from the sleeve.

2. Apparatus as set forth in claim 1 wherein the sleeve has a diametrically reduced portion on which the grommet is mounted, a shoulder at one end of the grommet accommodating portion and anchoring means at the other end of the grommet accommodating portion for holding the sleeve in a secured position relative to the grommet.

3. Apparatus as set forth in claim 2 wherein rigid washers are mounted on the reduced portion of the sleeve at opposite ends of the grommet for containing same.

References Cited in the file of this patent

UNITED STATES PATENTS

| | | |
|---|---|---|
| 1,344,344 | Howard | June 22, 1920 |
| 1,807,028 | Culver | May 26, 1931 |
| 1,862,105 | Wharam | June 7, 1932 |
| 2,063,729 | Dykstra | Dec. 8, 1936 |
| 2,128,986 | Chilton | Sept. 6, 1938 |
| 2,171,073 | Winning | Aug. 29, 1939 |
| 2,249,220 | McCann | July 15, 1941 |
| 2,251,893 | Snell | Aug. 5, 1941 |
| 2,362,458 | Arens | Nov. 14, 1944 |
| 2,460,236 | Osborn | Jan. 25, 1949 |
| 2,608,881 | Sandberg | Sept. 2, 1952 |
| 2,615,350 | Wahlberg et al. | Oct. 28, 1952 |
| 2,664,014 | Feemster et al. | Dec. 29, 1953 |
| 2,722,136 | Krause | Nov. 1, 1955 |